Feb. 20, 1945. A. P. E. PLANIOL ET AL 2,369,795
GASEOUS FLUID TURBINE OR THE LIKE
Filed Nov. 17, 1941
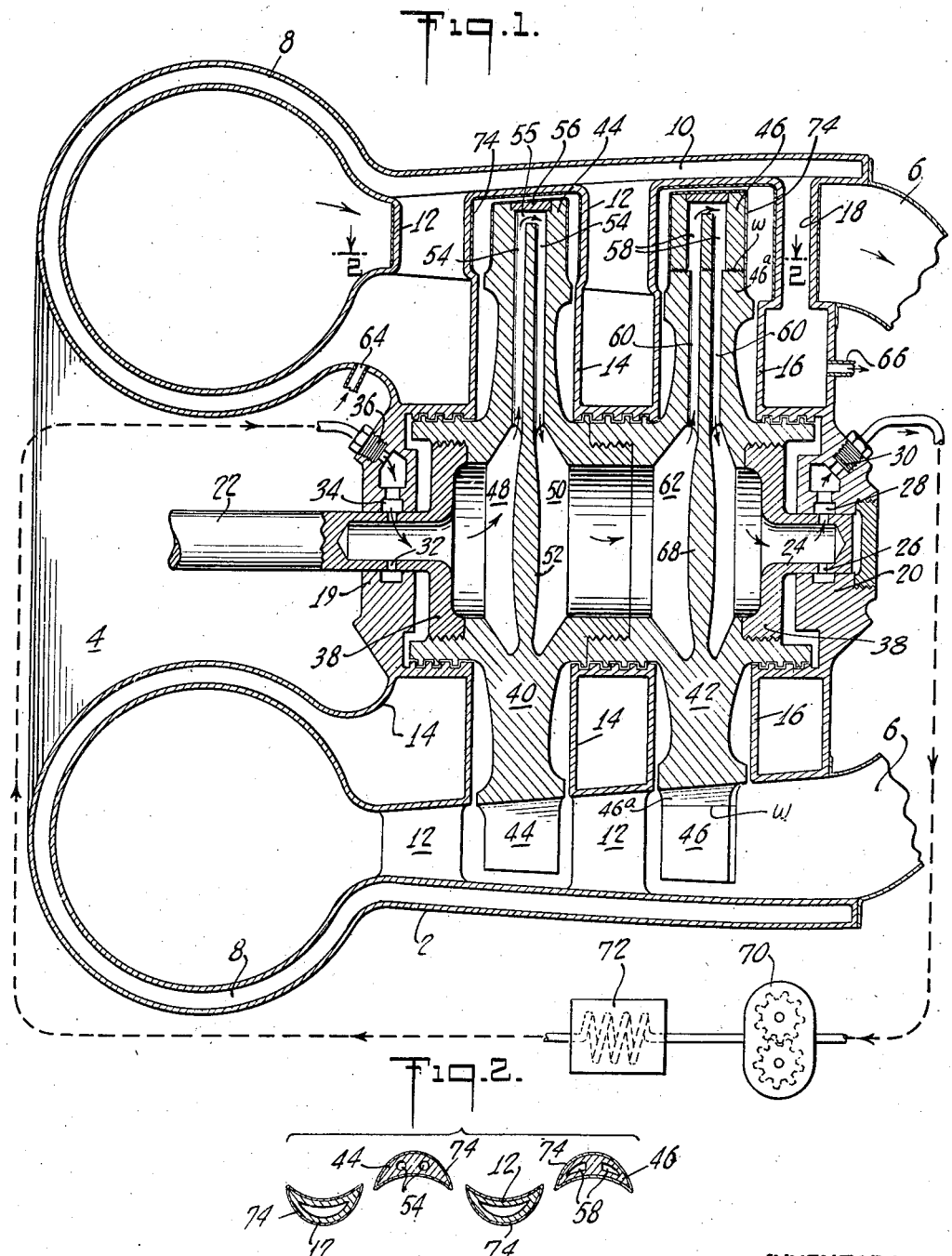
INVENTORS
ANDRÉ P. E. PLANIOL
RENÉ J. H. PLANIOL
BY
Bartlett, Eyre, Keel & Weymouth
ATTORNEYS Patented Feb. 20, 1945

2,369,795

UNITED STATES PATENT OFFICE 2,369,795

GASEOUS FLUID TURBINE OR THE LIKE

André P. E. Planiol, Huntington, and René J. H. Planiol, New York, N. Y.

Application November 17, 1941, Serial No. 419,464

1 Claim. (Cl. 60—41)

Our present invention relates to gaseous fluid turbines, more particularly to gas turbines and to exhaust turbines of the type employed on aircraft for supercharging the engine and comprises an improved gaseous fluid turbine of either type which will withstand high temperatures without rapid deterioration and which will operate efficiently at relatively high speeds.

It has been recognized that the deleterious effect of high temperatures on turbine blades could be avoided if means were provided for circulating cooling fluid through the blades and various constructions utilizing hollow blades for this purpose have been proposed. The prior proposed constructions, however, were not suitable for incorporation in high speed turbines either of the gas or exhaust type because requiring the rotating elements to be made of a great many separate parts, in which case excessive leakage of the cooling fluid could not be avoided, and the mechanical strength of the structure would be insufficient to withstand the centrifugal force created at high speeds, or because requiring thin walled blades which could not maintain their contour under the great centrifugal hydrostatic pressure developed therein when the turbine operates at high speeds.

In accordance with the present invention we are able to construct a turbine having cooled rotating and stationary elements but which does not have the defects inherent in the prior proposed constructions. The rotating elements of the new turbine are made of but few pieces and are not axially pierced, and the blades thereof are so formed as to keep their shape under high centrifugal pressure while being adequately cooled by cooling fluid passing therethrough. In the preferred embodiment of the invention, a protective coating of ceramic material on the blades offers additional protection against overheating either of the blades or of the cooling medium and prevents too great a loss of heat by the gases.

In the accompanying drawing, the invention is illustrated as embodied in an exhaust turbine suitable for use in airplanes, but it will be apparent that the invention is equally applicable to gas turbines.

Fig. 1 is a longitudinal sectional view of an exhaust turbine embodying the invention; and Fig. 2 is a section through the fixed and moving blades thereof taken on the line 2—2 of Fig. 1.

For simplicity, the particular turbine illustrated has but two pressure stages but it will be understood that the invention is not concerned with any particular number of stages, as additional stages of similar construction could be provided if desired. As shown in the drawing, the turbine comprises a double walled casing 2 communicating at one end with the inlet scroll 4 for the exhaust gases and at the other end with the collector 6. The scroll 4 is double walled to provide the annular chambers 8 in communication with the peripheral chamber 10 of the casing 2 and with the interior of hollow distributor blades 12 mounted between the inner wall of casing 10 and hollow rings 14. A similar hollow ring 16 at the low pressure end of the turbine is connected to the casing 2 by three hollow supporting arms 18 (of which one only appears in the sectional view). Ring 14 of the high pressure stage and ring 16 support bearings 19 and 20 for the shaft 22 and shaft extension 24 respectively of the rotor elements. Shaft extension 24 is hollow and is provided with a plurality of circumferential holes 26 which communicate with an annular passage 28 in bearing 20, which in turn communicates with an outlet port 30 for the cooling medium. Shaft 22 adjacent the bearing 19 is likewise hollow and provided with circumferential holes 32 communicating through an annular passage 34 in the bearing with an inlet port 36 for the cooling medium. The rotating elements, now to be described, are screw-threaded to flanges 38 on the shaft 22 and shaft extension 24 and comprise drums 40 and 42 carrying on their circumference the blades 44 and 46 respectively. The rotating elements and shafts could be secured together by other means, if desired. For example, the moving parts could be welded together.

The drum 40 is not pierced axially but is recessed on opposite sides of its central portion to provide chambers 48 and 50 communicating through the hollow portion of shaft 22 with the outlet passage 36 and with a similar chamber 62 recessed in drum 42, respectively. Chambers 48 and 50 are thus separated axially by the central portion 52 of the drum. They are connected, however, through pairs of radial passages 54 which are drilled in the blades 44 and in the portion of the drum extending between the hollow rings 14; passages 54 being connected adjacent the tips of the blades by small chambers 55.

In accordance with the invention, drum 40 and blades 44 thereof are formed from a single piece of metal, which may be steel, copper-chromium or an alloy of aluminum. A forged pancake or disk is machined on a lathe to give it the proper contour and to form the screw fittings or surfaces for welding. The blades 44 are cut on a milling machine. The chambers 55 are cut in the tips of the blades and the passages 54 drilled through to the recesses 48 and 50. A cap 56 is electrically welded to the tip of each blade to close the chamber 55 thereof.

The low pressure element including the drum 42 and blades 46 may be made in the same way as above described in connection with the high pressure element except that it is difficult, if not impossible, to mill very long blades directly from the metal block and, therefore, when long blades are required we form the blades separately and then aline them with, and butt weld them to, short blades 46a milled on the circumference of the drum. Such a weld line is indicated in the drawing at w, the part of each blade 46 between this line and the drum being the milled portion 46a and the part beyond this line being the previously formed portion of the blade. With the blades 46 being made in this manner, it becomes possible to form the passages 58 therein by protrusion instead of by drilling. Thus the passages 58 need not be circular in cross-section but may, for example, have the section shown in Fig. 2, which increases the efficacy of the cooling medium on the blade edges due to the smaller distance between blade edge and passage. Before the blades 46 have been welded to the blade projections 46a on the drum with the passages 58 of the blades meeting the drilled passages 60 of the drum, the blades may be twisted about their axes normal to the axis of the turbine to increase the aerodynamical efficiency. Thus by forming the blades 46 separately and then butt welding them to the blade stubs 46a, not only are longer blades possible and more advantageously shaped passages obtainable, but also the direction of the passages 58 need not be exactly radial from the chamber 62 to the tip of the blade, a change in direction being allowable at the weld.

In operation of the above described turbine, water or air is admitted at 84 to cool the blades 12 of the fixed distributors and the casing walls and passes out through the port 66 in the ring 16. In the particular embodiment of the invention illustrated, the cooling medium for the rotating elements is introduced through the inlet 36 in bearing 19, and is emitted through the port 30 in bearing 20, hence the cooling medium is preferably oil which serves also to lubricate the bearings. If water, or other non-lubricating fluid is to be used as the cooling medium, then the fluid would of course be introduced and emitted at ports not located at the bearings and the lubricating fluid at the bearings would be kept out of communication with the cooling medium. The new construction of rotor elements with their continuous central sections 52 and 68 causes the cooling medium, in this case oil, to travel radially outward through the first passages 54 of the high pressure stage, then radially inward to chamber 50 and from thence radially outwardly and then inwardly through passages 60 and 58 of the low pressure stage. A pump 70, preferably of volumetric reversible type, starts the flow of oil through the turbine but, due to the heating and expansion of the oil in its passage through the turbine and the high centrifugal forces developed, a strong thermo-syphon effect develops causing the oil to flow faster and faster until the pump, instead of acting to drive the oil through the turbine, acts as a hydraulic motor and power is delivered thereto which can be usefully applied, for example, to the turbine shaft. Before introduction into the turbine the oil from pump 70 is cooled by passage through any suitable radiator or cooler, indicated diagrammatically in the drawing at 72.

To prevent undue reduction of the temperature and hence of the kinetic energy of the gases, with consequent reduction in the power of the turbine, we preferably coat the blades with a ceramic material, such as enamel, which will reduce the transfer of heat from the gases through the blades to the cooling mediums. Such coating is shown diagrammatically in the drawing and indicated by the reference numeral 74.

The invention has now been described in connection with the preferred embodiment. Obviously, various changes in the particular structure illustrated could be made without departing from the spirit of the invention as defined in the accompanying claim. For example, although we have shown and described the fixed blades of the distributors as being internally cooled, this is not always essential as these blades, being stationary and hence not subject to mechanical stress, may suffer a reduction in tensile strength due to the high temperatures without substantial deleterious effect upon the operation of the turbine. For very high temperatures of the gases, however, cooled distributor blades are superior and hence preferred. Also, as heretofore indicated, although a turbine with but two pressure stages has been shown and described, the invention is not concerned with any particular number of pressure stages.

When the new turbine is used as a gas or combustion turbine in power plants or marine engines, its ability to withstand high temperatures increases the capacity of the plant and hence permits a reduction in the normal complement of turbines of the plant with consequent saving in fuel and equipment. When used as an exhaust turbine on airplanes precooling of exhaust gases is avoided and power greater than that required for driving the supercharger may be obtained therefrom, such excess power being then available for other purposes.

By the term "gaseous fluid" as used herein and in the appended claim, we mean a turbine operative on a gaseous fluid, whether such fluid be exhaust gases, as in exhaust turbines, or whether it be gases of combustion of any type of fuel such as in so-called gas or combustion turbines.

We claim:

A gaseous fluid turbine comprising in combination a casing carrying inwardly directed blades forming fixed distributors of different pressure stages for the working fluid, said casing including bearings, hollow shaft elements mounted in said bearings for rotation in said casing, wheels secured between said shaft elements for rotation therewith, each wheel comprising a disk carrying radially extending blades for cooperation with the blades of said distributors, said disks having a plurality of pairs of radial passages extending from recesses on the opposite sides of a central unpierced portion of the wheel and having pairs of passages completely enclosed within the blade, said blade passages being interconnected adjacent the tip of the blade and continuous with a pair of the disk passages, and means for introducing cooling fluid through one bearing into one shaft element and for withdrawing the fluid from the other shaft element through the other bearing whereby the cooling fluid operates as a lubrication for the bearings and circulates through the blade passages without inter-mixture with the working fluid.

RENÉ J. H. PLANIOL.
ANDRÉ P. E. PLANIOL.